(12) United States Patent
Chen

(10) Patent No.: US 12,238,408 B2
(45) Date of Patent: Feb. 25, 2025

(54) DISPLAY METHOD PERFORMED BY ELECTRONIC DEVICE AND ELECTRONIC DEVICE

(71) Applicant: VIVO MOBILE COMMUNICATION CO., LTD., Dongguan (CN)

(72) Inventor: Peng Chen, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 253 days.

(21) Appl. No.: 17/959,831

(22) Filed: Oct. 4, 2022

(65) Prior Publication Data

US 2023/0025705 A1   Jan. 26, 2023

Related U.S. Application Data

(63) Continuation of application No. PCT/CN2021/085543, filed on Apr. 6, 2021.

(30) Foreign Application Priority Data

Apr. 10, 2020   (CN) ............ 202010280290.5

(51) Int. Cl.
*H04N 23/63* (2023.01)
*G06F 1/16* (2006.01)
(Continued)

(52) U.S. Cl.
CPC ......... *H04N 23/632* (2023.01); *G06F 1/1641* (2013.01); *G06F 1/1686* (2013.01); *G06F 3/044* (2013.01); *H04N 5/2628* (2013.01)

(58) Field of Classification Search
CPC .... H04N 23/632; H04N 5/2628; H04N 23/57; G06F 1/1686; G06F 1/1641; G06F 3/044
See application file for complete search history.

(56) References Cited

U.S. PATENT DOCUMENTS

| | | | |
|---|---|---|---|
| 6,025,841 A | | 2/2000 | Finkelstein et al. |
| 2003/0058363 A1 | | 3/2003 | Boyden et al. |

(Continued)

FOREIGN PATENT DOCUMENTS

| | | |
|---|---|---|
| CN | 103535051 A | 1/2014 |
| CN | 104320585 A | 1/2015 |

(Continued)

OTHER PUBLICATIONS

European Patent Office, Extended European Search Report issued in corresponding Application No. EP 21785138, dated Sep. 7, 2023.

(Continued)

*Primary Examiner* — Nicholas G Giles

(74) *Attorney, Agent, or Firm* — Stites & Harbison, PLLC; Jeffrey A. Haeberlin

(57) ABSTRACT

A display method and an electronic device (600) are provided. The electronic device (600) includes a body and a camera module (30) detachably connected to the body, the body has a display screen (31), and the method includes: acquiring, by using the camera module (30), image information in a case that the camera module (30) is attached to a first region of the display screen (31); and displaying the image information in a second region of the display screen (31), where the second region is a region other than the first region in the display screen (31).

16 Claims, 6 Drawing Sheets

(51) Int. Cl.
*G06F 3/044* (2006.01)
*H04N 5/262* (2006.01)

(56) References Cited

U.S. PATENT DOCUMENTS

| | | | |
|---|---|---|---|
| 2014/0028557 A1 | 1/2014 | Otake | |
| 2018/0007258 A1 | 1/2018 | Seko | |
| 2019/0373214 A1* | 12/2019 | Gurr | ................ H04N 23/62 |

FOREIGN PATENT DOCUMENTS

| | | | |
|---|---|---|---|
| CN | 104378465 | A | 2/2015 |
| CN | 105808040 | A | 7/2016 |
| CN | 108696688 | A | 10/2018 |
| CN | 109274792 | A | 1/2019 |
| CN | 208445604 | U | 1/2019 |
| CN | 109298844 | A | 2/2019 |
| CN | 109936733 | A | 6/2019 |
| CN | 110557472 | A | 12/2019 |
| CN | 110753175 | A | 2/2020 |
| JP | 2019-121402 | A | 7/2019 |
| KR | 100801026 | B1 | 1/2008 |
| WO | 2017/085787 | A1 | 5/2017 |
| WO | 2020/062294 | A1 | 4/2020 |

OTHER PUBLICATIONS

Japan Patent Office, First Office Action issued in corresponding Application No. JP 2022-560201, dispatched Jan. 9, 2024. (Translation not available.).
China National Intellectual Property Administration, International Search Report issued in corresponding Application No. PCT/CN2021/085543, mailed Jul. 12, 2021.
Intellectual Property India, Examination Report issued in corresponding Application No. 202227063648, dated Jan. 24, 2023.
China National Intellectual Property Administration, First Search Report issued in corresponding Application No. 202010280290.5 dated Jan. 28, 2023 (translation not available).
China National Intellectual Property Administration, Office Action issued in corresponding Application No. 202010280290.5 dated Jan. 28, 2023 (translation not available).

* cited by examiner

DISPLAY METHOD PERFORMED BY ELECTRONIC DEVICE AND ELECTRONIC DEVICE

CROSS-REFERENCE TO RELATED APPLICATIONS

This application is a continuation of International Application No. PCT/CN2021/085543, filed on Apr. 6, 2021, which claims priority to Chinese Patent Application No. 202010280290.5 filed on Apr. 10, 2020, which is incorporated herein by reference in its entirety.

TECHNICAL FIELD

Embodiments of the present disclosure relate to the field of communication technologies, and in particular, to a display method and an electronic device.

BACKGROUND

With the development of electronic devices, functions of the electronic devices are more and more abundant. For example, an electronic device has a camera module and a display screen, the camera module may acquire image information, and the electronic device may display the image information acquired by the camera module through the display screen.

At present, a display region used for displaying the image information in the display screen is fixed. In this way, if an object comes into contact with the display region used for displaying the image information, a user cannot view the entire image information, resulting in a poor display effect of the image information.

SUMMARY

According to a first aspect of the present disclosure, a display method, applied to an electronic device, is provided, the electronic device includes a body and a camera module detachably connected to the body, the body has a display screen, and the method includes:
  acquiring, by using the camera module, image information in a case that the camera module is attached to a first region of the display screen; and
  displaying the image information in a second region of the display screen, where
  the second region is a region other than the first region in the display screen.

According to a second aspect of the present disclosure, an electronic device is provided, the electronic device includes a body and a camera module detachably connected to the body, the body has a display screen, and the electronic device includes:
  an acquisition module, configured to acquire, by using the camera module, image information in a case that the camera module is attached to a first region of the display screen; and
  a first display module, configured to display the image information in a second region of the display screen, where
  the second region is a region other than the first region in the display screen.

According to a third aspect of the present disclosure, an electronic device is provided. The electronic device includes a processor, a memory, and a program stored on the memory and executable on the processor, the program, when executed by the processor, implementing the steps of the display method described above.

According to a fourth aspect of the present disclosure, a computer-readable storage medium is provided. The computer-readable storage medium stores a computer program, the computer program, when executed by a processor, implementing the steps of the display method applied to an electronic device described above.

BRIEF DESCRIPTION OF THE DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings according to such accompanying drawings without creative efforts.

DETAILED DESCRIPTION

The technical solutions of embodiments of the present disclosure are clearly described below with reference to the accompanying drawings in the embodiments of the present disclosure. Obviously, the described embodiments are a part rather than all of the embodiments of the present disclosure. All other embodiments obtained by a person of ordinary skill in the art based on the embodiments of the present disclosure without creative efforts shall fall within the protection scope of the present disclosure.

The terms "first" and "second" in the embodiments of the present disclosure are used to distinguish similar objects, but are unnecessarily used to describe a specific sequence or order. Further, the terms "include", "comprise", "have", and any variations thereof, are intended to cover non-exclusive inclusion. For example, a process, method, system, product, or device that includes or comprises a series of steps or units is not necessarily limited to the expressly enumerated steps or units, but may include other steps or units that are not expressly enumerated or that are inherent to the process, method, product, or device.

A display method in the embodiments of the present disclosure is applied to an electronic device, where the electronic device includes a body and a camera module detachably connected to the body, and the body has a display screen.

During specific implementation, the body may have a receiving groove used for receiving the camera module. If a user does not need to use the camera module, the camera module may be received in the receiving groove. If the user needs to use the camera module, the camera module may be taken out from the receiving groove for use.

Further, the camera module may be fixed to the body. For example, the camera module is fixed to the display screen of the body to be used as a front-facing camera module; or the camera module is fixed to another surface of the body opposite to the display screen to be used as a rear-facing camera module. The display screen of the electronic device may be used for displaying image information acquired by the camera module, for the user to view the image information acquired by the camera module.

In actual application, the electronic device may be a mobile phone, a tablet personal computer (Tablet Personal Computer), a laptop computer (Laptop Computer), a personal digital assistant (PDA), a mobile Internet device (MID), a wearable apparatus (Wearable Device), an in-vehicle device, or the like.

The display method in the embodiments of the present disclosure is described below.

Figure 1:
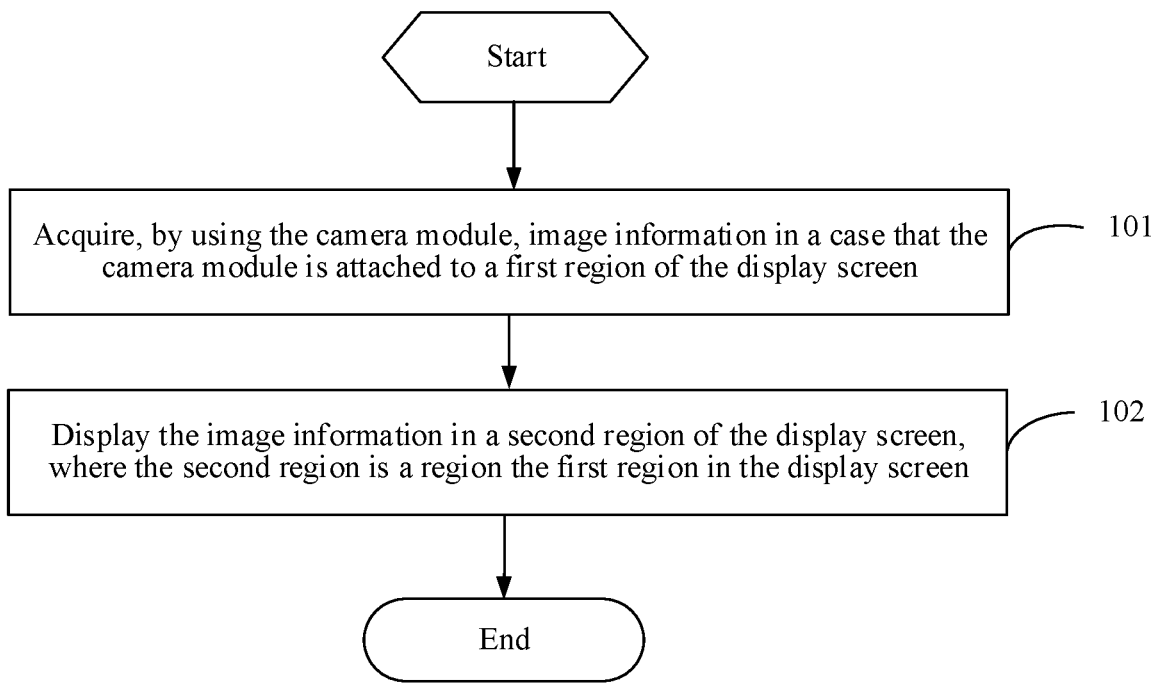
FIG. 1 is a first flowchart of a display method according to an embodiment of the present disclosure.

FIG. 1 is a first flowchart of a display method according to an embodiment of the present disclosure. As shown in FIG. 1, the display method may include the following steps.

Step 101. Acquire, by using the camera module, image information in a case that the camera module is attached to a first region of the display screen.

During specific implementation, the camera module may be attached to the first region in a manner of adhesion or adsorption. The manner in which the camera module is attached to the first region is not limited in this embodiment. In addition, the camera module may start to acquire the image information before, when, or after the camera module is attached to the first region.

Step 102. Display the image information in a second region of the display screen, where the second region is a region other than the first region in the display screen.

During specific implementation, the second region may include a part of a region or the entire region other than the first region in the display screen. Detailed descriptions are as follows:

It is assumed that the electronic device displays the image information through a target region of the display screen before the camera module is attached to the first region of the display screen. It should be noted that, the target region may be a part of a display region or the entire display region of the display screen.

Case 1. The target region is the entire display region of the display screen.

In case 1, before the camera module is attached to the first region of the display screen, the display screen only includes the target region, and the image information is displayed in the display screen in full screen.

In this case, if the camera module is attached to the first region, the first region is located in the target region. Therefore, the second region may be a part of a display region or the entire display region other than the first region in the display screen.

Exemplarily: it is assumed that the electronic device displays the image information in full screen through the display screen before the camera module is attached to the first region of the display screen. Therefore, in a case that the camera module is attached to the first region of the display screen, the image information may be displayed through the part of the display region or the entire display region other than the first region in the display screen.

In this way, in a case that the camera module is attached to the first region, the electronic device can flexibly adjust the display region of the image information, and can ensure that a user views the entire image information, so that the display effect of the image information can be improved.

Case 2. The target region is the part of the display region of the display screen.

Optionally, before the camera module is attached to the first region of the display screen, the display screen of the electronic device may include the target region and a third region, and the third region may be used for displaying a function control, such as a setting control, or a camera control.

In this case, if the camera module is attached to the first region, the first region may or may not overlap the target region. In actual application, when the first region includes a part of the target region or the entire target region, it may be regarded that the first region overlaps the target region; and when the first region does not include the target region, it may be regarded that the first region does not overlap the target region.

Optionally, in a case that the target region overlaps the first region, the second region may include a part of a region or the entire region other than the first region in the target region; and in a case that the target region does not overlap the first region, the second region may include a part of the target region or the entire target region.

In this way, in a case that the camera module is attached to the first region, the electronic device can flexibly adjust the display region of the image information, and can ensure that a user views the entire image information, so that the display effect of the image information can be improved.

In addition, in this case, the first region may or may not overlap the third region. Optionally, in a case that the first region overlaps the third region, that is, the first region includes a part of the third region or the entire third region, the method further includes: displaying the function control in a fourth region of the display screen, where the fourth region is a region other than the first region and the second region in the display screen. In a case that the first region does not overlap the third region, the fourth region may be the third region.

In this way, in a case that the camera module is attached to the first region, the electronic device may further adjust the display region of the function control when the first region overlaps the third region, so that the region attached to the camera module in the display screen, the region displaying the image information, and the display region displaying the function control are independent. In an aspect, not affected by the camera module being attached to the display screen, the user can view the entire image information, so that the display effect of the image information can be improved. In another aspect, not affected by the camera module being attached to the display screen, the user can view the entire function control, so that the operation effect of the image information can be improved.

For ease of understanding, exemplary descriptions are as follows:

It is assumed that, before the camera module is attached to the first region of the display screen, the electronic device displays the image information through a region a of the display screen, and displays the function control through a region b of the display screen. That is, the target region is the region a, and the third region is the region b.

If the first region is located in the region a and an area of the region a is greater than that of the first region, that is, the camera module is attached to a part of the region a, the image information may be updated to be displayed through a region other than the first region in the region a, and the display region of the function control does not change and the function control is still displayed through the region b. It can be seen that, in this case, the second region is the entire region other than the first region in the region a, and the fourth region is the region b.

If one part of the first region is located in the region a and the other part is located in the region b, the image information may be updated to be displayed through a region other than the first region in the region a, and the function control may be updated to be displayed through a region other than the first region in the region b. It can be seen that, in this case, the second region is the region other than the first region in the region a, and the fourth region is the region other than the first region in the region b.

Optionally, if the first region is located in the region b, the image information may be updated to be displayed through a first part of the region a, and the function control may be updated to be displayed through a second part of the region a. It can be seen that, in this case, the second region is the first part of the region a, and the fourth region is the second part of the region a.

According to a display method in this embodiment of the present disclosure, an electronic device includes a body and a camera module detachably connected to the body, and the body has a display screen. In a case that the camera module is attached to a first region of the display screen, the electronic device acquires, by using the camera module, image information, and displays the image information in a second region of the display screen, where the second region is a region other than the first region in the display screen. In this way, even though the camera module blocks the first region of the display screen, a user can still view the entire image information in the second region, so that the display effect of the image information can be improved.

In this embodiment, optionally, the camera module has a connection contact point, and the camera module is attached to the first region through the connection contact point; the body has a detection module; and before the displaying the image information in a second region of the display screen, the method further includes:

detecting the connection contact point by using the detection module, to determine the first region; and determining the second region according to the first region.

I. Determination of the First Region is Described Below in Detail.

Optionally, N connection contact points are arranged on a first end surface on which the camera module is attached to the display screen, N being a positive integer; and the detecting the connection contact point by using the detection module, to determine the first region includes:

detecting a first coordinate point in the display screen by using the detection module, the first coordinate point being a coordinate point corresponding to a position at which the connection contact point is attached to the display screen; and determining the first region corresponding to the first end surface according to the N first coordinate points in a case that a quantity of detected first coordinate points is equal to N and a first graph formed by the N first coordinate points matches a second graph formed by the N connection contact points.

During specific implementation, a detection result of the detection module at the first coordinate point is different from a detection result of the detection module at another coordinate point. Therefore, the electronic device may detect the first coordinate point by using the detection module.

It should be understood that, for connection contact points in different forms, detection modules in the body may be different, so that the detection modules may detect the first coordinate point in different manners. Detailed descriptions are as follows:

Implementation 1. The connection contact point is a metal contact point, and the detection module is a capacitance detection module; and in a case that the camera module is attached to the first region through the connection contact point, the body detects capacitance values of a plurality of regions of the display screen by using the capacitance detection module, and determines the first coordinate point according to the capacitance values.

In implementation 1, in a case that the first end surface of the camera module is attached to the display screen, the capacitance values of positions at which the display screen comes into contact with the N metal contact points may change. Therefore, the electronic device may determine coordinate points whose capacitance values detected by the capacitance detection module change as the first coordinate points.

In implementation 1, at least one camera of the camera module may be arranged on at least one end surface other than the first end surface of the camera module. In addition, optionally, the at least one end surface other than the first end surface of the camera module may have a metal conductive member, and the metal conductive member is electrically connected to the N metal contact points, and is configured to ground the N metal contact points. In this way, in a case that the first end surface of the camera module is attached to the display screen and a finger of the user comes into contact with the metal conductive member, the metal contact point can be grounded through the metal conductive member and the human body, so that the capacitance values of the positions at which the display screen comes into contact with the N metal contact points may change.

Figure 2A:
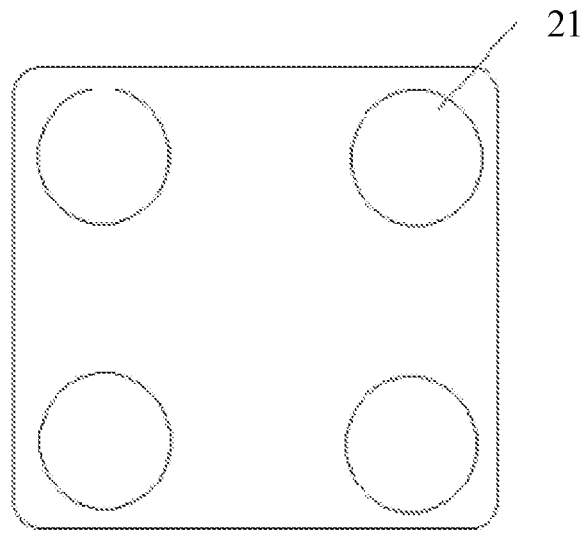
FIG. 2a is a bottom view of a camera module according to an embodiment of the present disclosure.
Figure 2B:
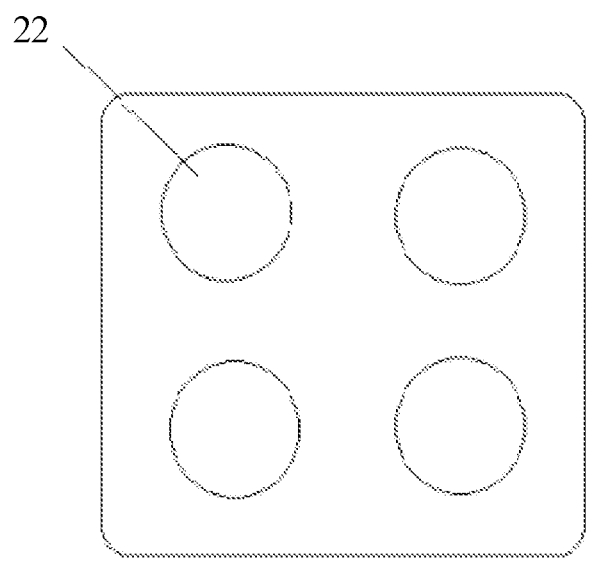
FIG. 2b is a top view of a camera module according to an embodiment of the present disclosure.
Figure 2C:
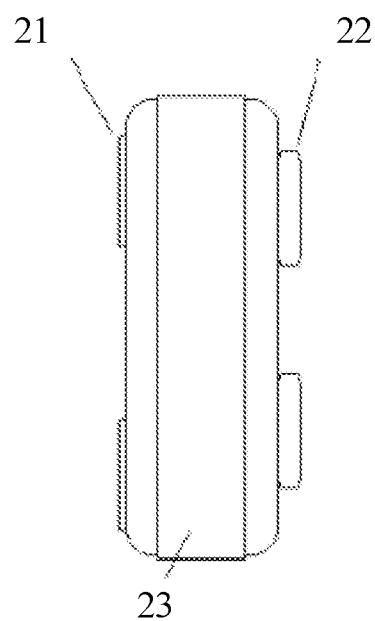
FIG. 2c is a side view of a camera module according to an embodiment of the present disclosure.

Exemplarily: the first end surface of the camera module has the N metal contact points, a second end surface of the camera module opposite to the first end surface has at least one camera, and a side surface of the camera module has a metal conductive ring. For ease of understanding, referring to FIG. 2a to FIG. 2c together, FIG. 2a is a bottom view of a camera module according to an embodiment of the present disclosure; FIG. 2b is a top view of a camera module according to an embodiment of the present disclosure; and FIG. 2c is a side view of a camera module according to an embodiment of the present disclosure.

An end surface shown in FIG. 2a is the first end surface of the camera module. In FIG. 2a, the first end surface has four metal contact points 21, and a graph formed by the four metal contact points is a square. An end surface shown in FIG. 2b is the second end surface of the camera module. In FIG. 2b, the first end surface has four cameras 22, and a graph formed by the four cameras is a square. As shown in FIG. 2c, the side surface of the camera module has a metal conductive ring 23.

It should be understood that, a set quantity and set positions of the metal contact points in FIG. 2a are only exemplary, and the setting of the metal contact points in the first end surface is not therefore limited. A set quantity and set positions of the cameras in FIG. 2b are only exemplary, and the setting of the cameras in the second end surface is not therefore limited.

Implementation 2. The connection contact point is a magnetic contact point, and the detection module is a Hall sensor; and in a case that the camera module is attached to the first region through the connection contact point, the body detects magnetic induction strength values of a plurality of regions of the display screen by using the Hall sensor, and determines the first coordinate point according to the magnetic induction strength values.

In implementation 2, in a case that the first end surface of the camera module is attached to the display screen, the magnetic induction strength values of positions at which the display screen comes into contact with the N magnetic contact points may change. Therefore, the electronic device may determine coordinate points whose magnetic induction strength values detected by the Hall sensor change as the first coordinate points.

Implementation 3. The connection contact point is an optical contact point, and the detection module is an optical sensor; and in a case that the camera module is attached to the first region through the connection contact point, the body detects optical induction strength values of a plurality of regions of the display screen by using the optical sensor, and determines the first coordinate point according to the optical induction strength values.

In implementation 3, in a case that the first end surface of the camera module is attached to the display screen, the optical induction strength values of positions at which the display screen comes into contact with the N optical contact points may change. Therefore, the electronic device may determine coordinate points whose optical induction strength values detected by the optical sensor change as the first coordinate points.

It should be understood that, the above implementations are only exemplary, and in other implementations, the connection contact point and the detection module may be in other implementations.

After at least one first coordinate point is detected, the electronic device may perform the following operations: determining whether a quantity of detected first coordinate points is equal to N; determining, if the quantity of the detected first coordinate points is equal to N, whether a first graph formed by the N first coordinate points matches a second graph formed by the N metal contact points; and determining, if the first graph matches the second graph, the first region according to the N first coordinate points.

During specific implementation, only in a case that the first graph and the second graph has the same shape and the same size, it can be regarded that the first graph matches the second graph. For example, when both the first graph and the second graph are a square with an edge length equal to 2 cm, it can be regarded that the first graph matches the second graph. Otherwise, it is regarded that the first graph does not match the second graph.

It can be seen that, only in a case that the quantity of the detected first coordinate points is equal to N and the first graph formed by the N first coordinate points matches the second graph formed by the N connection contact points, it can be determined that the camera module is attached to the display screen, so that the first region can be determined according to the N first coordinate points. In this way, the false-recognition rate of the first region can be reduced, and the accuracy of determining the first region can be improved.

Optionally, the determining the first region corresponding to the first end surface according to the N first coordinate points includes:

determining the first region corresponding to the first end surface according to the N first coordinate points and set positions of the N connection contact points on the first end surface, where an area of the first region is greater than or equal to that of the first end surface.

During specific implementation, the electronic device may determine the first region by determining a position of the first region and the area of the first region.

Determination of the position of the first region is described below.

The first region is a region in which the camera module is attached to the display screen, and the N first coordinate points are N coordinate points corresponding to the positions at which the display screen comes into contact with the N connection contact points of the camera module. Therefore, it is not difficult to understand that, the first region includes the positions corresponding to the N first coordinate points in the display screen.

Determination of the area of the first region is described below.

The electronic device may first determine an area S2 of the second graph formed by the N connection contact points according to the set positions of the N connection contact points on the first end surface, and then obtain a ratio K of the area S2 of the second graph to the area of the first end surface.

It can be seen from the foregoing content that, the first graph and the second graph has the same shape and the same size, which indicates that the area of the first graph is equal to that of the second graph. Therefore, the electronic device may determine that an area S of the first region is greater than or equal to S2/K. Further, the area of the first region may be greater than or equal to an area of an orthographic projection of the camera module on the display screen.

It should be noted that, a shape of the first region finally determined by the electronic device may be the same as or different from a shape of the orthographic projection of the camera module on the display screen. For example, the first region finally determined by the electronic device overlaps a region of the orthographic projection of the camera module on the display screen; or the first region finally determined by the electronic device includes the region of the orthographic projection of the camera module on the display screen, and the area of the first region is greater than the area of the orthographic projection.

II. Determination of the Second Region is Described Below in Detail.

Optionally, the determining the second region according to the first region includes:

obtaining a target distance between at least one target point of the first region and a target edge of the display screen; and determining the second region according to the target distance, where the target point is a point on an edge of the first region; the target distance includes at least one of the following: a first target distance between a first target point and a first edge of the display screen, the first target point being a point closet to the first edge in the first region; or a second target distance between a second target point and a second edge of the display screen, the second target point being a point closet to the second edge in the first region; and the second edge is adjacent to the first edge.

Further, in a case that the target distance includes the first target distance or the second target distance, the determining the second region according to the target distance includes at least one of the following:

determining that the second region is located between the first region and the target edge in a case that the target distance is greater than a first threshold; or determining that the second region is located between the first region and a third edge in a case that the target distance is less than or equal to the first threshold, where the third edge is a fourth edge opposite to the target edge in the display screen; or in a case that the display screen includes a third region displaying a function control and edges of the third region include the fourth edge, the third edge is an edge opposite to the fourth edge in the third region.

During specific implementation, a comparison result of the target distance and the first threshold may be used for reflecting whether the first region is closer to the target edge or closer to the third edge.

Optionally, in a case that the target distance is greater than the first threshold, it indicates that a distance between the first region and the target edge is greater than a distance between the first region and the third edge. Therefore, the electronic device may display the image information between the first region and the target edge.

In a case that the target distance is less than or equal to the first threshold, it indicates that the distance between the first region and the target edge is less than the distance between the first region and the third edge. Therefore, the electronic device may display the image information between the first region and the third edge.

In this way, on a basis that the user views the entire image information, the display region of the image information can be maximized, so that the display effect of the image information is improved.

Certainly, in other implementations, the comparison result of the target distance and the first threshold may not be used for reflecting whether the first region is closer to the target edge or closer to the third edge, and the first threshold may be any preset threshold. For example, even though the distance between the first region and the target edge is greater than the distance between the first region and the third edge, if the target distance is less than or equal to the first threshold, the electronic device still displays the image information in the second region located between the first region and the third edge.

In actual application, for a scenario 1 in which the second region is located between the first region and the target edge, in some implementations, the second region may include an edge of the first region closer to the target edge, and may also include the target edge; and in other implementations, there may be an interval between the second region and the edge of the first region closer to the target edge, and/or there may be an interval between the second region and the target edge. Similarly, for a scenario 2 in which the second region is located between the first region and the third edge, in some implementations, the second region may include an edge of the first region closer to the third edge, and may also include the third edge; and in other implementations, there may be an interval between the second region and the edge of the first region closer to the third edge, and/or there may be an interval between the second region and the third edge.

For ease of understanding, refer to FIG. 3a to FIG. 3d. In FIG. 3a to FIG. 3d, a camera module 30 is horizontally fixed to a display screen 31. The display screen 31 includes a first shorter edge 311 and a second shorter edge 312. In addition, the display screen 31 includes a third region 313 displaying a function control, the third region 313 includes the second shorter edge 312, and a third edge 314 is an edge opposite to the second shorter edge 312 in the third region 313. A first region of the display screen 31 is a region of an orthographic projection of the camera module 30 on the display screen. A first target distance dl is a distance between any point on an upper edge 301 of the camera module 30 and the first shorter edge 311.

Figure 3A:
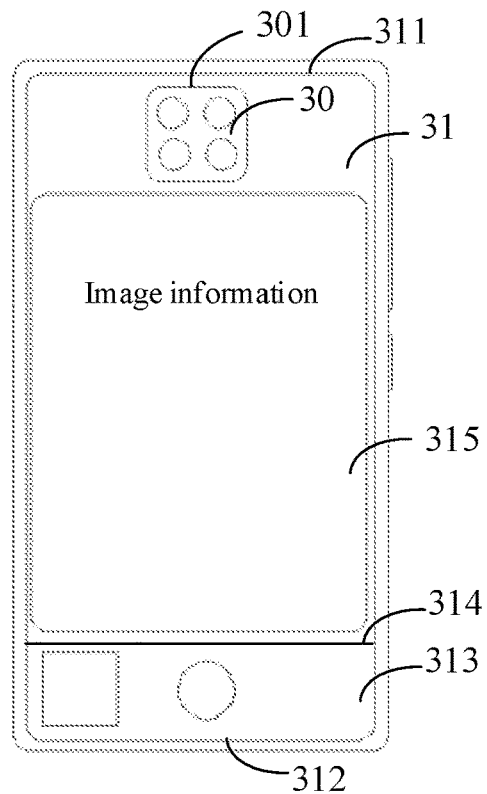
FIG. 3a is a first schematic diagram of an image preview interface according to an embodiment of the present disclosure.
Figure 3B:
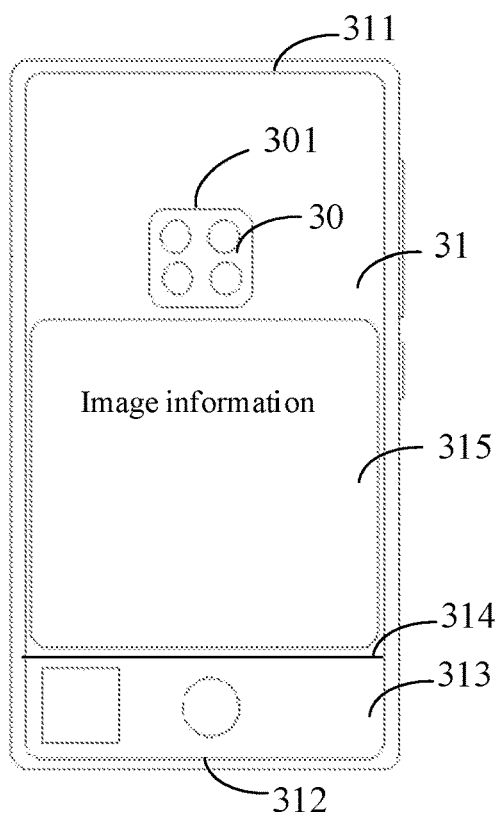
FIG. 3b is a second schematic diagram of an image preview interface according to an embodiment of the present disclosure.
Figure 3C:
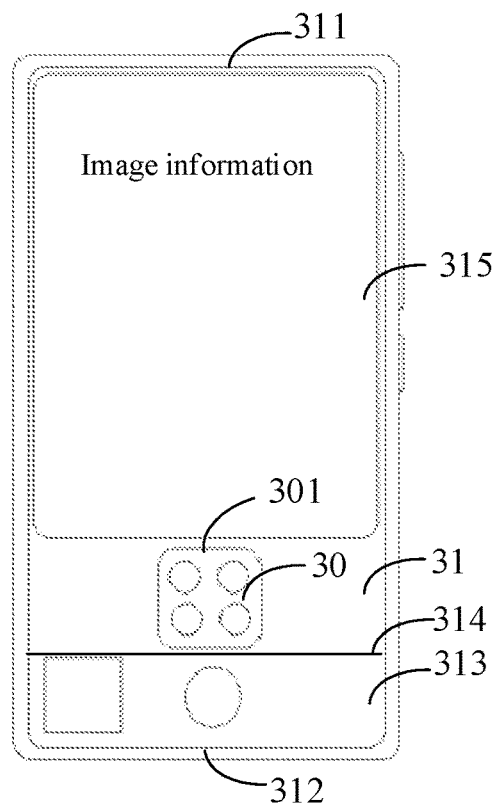
FIG. 3c is a third schematic diagram of an image preview interface according to an embodiment of the present disclosure.
Figure 3D:
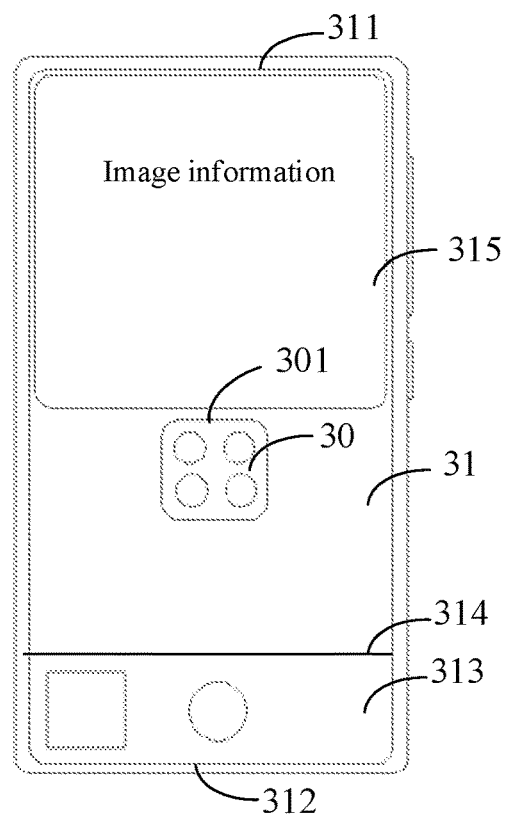
FIG. 3d is a fourth schematic diagram of an image preview interface according to an embodiment of the present disclosure.

In FIG. 3a and FIG. 3b, dl is less than the first threshold. Therefore, the display region of the image information, namely, a second region 315, is located between the first region and the third edge 314.

In FIG. 3a and FIG. 3b, dl is greater than the first threshold. Therefore, the display region of the image information, namely, the second region 315, is located between the first region and the first shorter edge 311.

In this embodiment, optionally, a quantity of second regions is P, P being a positive integer; and in a case that P is greater than 1:

the P second regions display one piece of the image information, and each of the second regions displays partial information of the image information; or at least one second region in the P second regions displays the image information.

During specific implementation, the electronic device may determine the P second regions, P being a positive integer.

In a case that P is greater than 1, that is, the quantity of the second regions determined by the electronic device is greater than 1, the electronic device may display the image information in the P second regions in the following manners.

Manner 1. The P second regions display one piece of the image information, and each of the second regions displays partial information of the image information.

In this manner, the image information is divided into P pieces of sub-image information, each piece of sub-image information is displayed through one second region in the P second regions, and the pieces of sub-image information respectively displayed by the P second regions are pieced into the entire image information acquired by the camera module.

Exemplarily, assuming that the image information is an image a and the electronic device determines three second regions, the electronic device may divide the image a into three sub-images, and each second region in the three second regions displays one sub-image.

It should be understood that, a size of the sub-image information displayed by each second region is in a positive correlation with an area of the second region, that is, the larger the area of the second region is, the larger the size of the sub-image information displayed by the second region is; otherwise, the smaller the size of the sub-image information is.

Manner 2. At least one second region in the P second regions displays the image information.

In this manner, each second region displaying the image information may display the entire image information acquired by the camera module. However, the second regions displaying the image information may be a part of the P second regions or the entire P second regions. In a case that the second regions displaying the image information is the part of the P second regions, other second regions not displaying the image information in the P second regions may not display any content, and the electronic device may further control the second regions not displaying any content to be turned off, to reduce the power consumption of a terminal.

For example, assuming that the image information is an image a and the electronic device determines three second regions, in an implementation, the electronic device may respectively display the image a in each second region in the three second regions; and in another implementation, the electronic device may respectively display the image a in two second regions in the three second regions, and another second region may not display any content, and the electronic device may further control the second regions not displaying any content to be turned off, to reduce the power consumption of a terminal.

It should be noted that, the above implementations are only exemplary, and in some implementations of manner 2, at least two second regions in the P second regions may jointly display the entire image information, or at least one region in the P second regions respectively displays the entire image information.

In this embodiment, optionally, the electronic device is a foldable electronic device, the display screen includes a first display screen and a second display screen, and the display screen has a folded state and an unfolded state; and in a case that the display screen is in the unfolded state and the first region is partly or entirely located in the first display screen, the second region is located in at least one of the first display screen or the second display screen.

Detailed Descriptions are as Follows:

1) A first part of the first region is located in the first display screen, and a second part of the first region is located in the first display screen.

In this case, the second region may include at least one of the following implementations:

Implementation 1. The second region is located in the first display screen.

Alternatively, the second region may be a part of a region or the entire region other than the first region in the first display screen.

Implementation 2. The second region is located in the second display screen.

Alternatively, the second region may be a part of a region or the entire region other than the first region in the second display screen.

Implementation 3. The second region is located in the first display screen and the second display screen.

Alternatively, the second region may be a part of a region or the entire region other than the first region in the first display screen and the second display screen.

Further, the first display screen and the second display screen may respectively include at least one second region, but is not limited thereto.

2) The entire first region is located in the first display screen.

In this case, the second region may include at least one of the following implementations:

Implementation 1. In a case that an area of the first display screen is greater than the area of the first region, the second region is located in the first display screen.

Alternatively, the second region may be a part of a region or the entire region other than the first region in the first display screen.

Implementation 2. The second region is located in the second display screen.

Alternatively, the second region may be a part of the second display screen or the entire second display screen.

Implementation 3. In a case that an area of the first display screen is greater than the area of the first region, the second region is located in the first display screen and the second display screen.

Alternatively, the second region may be a part of a region or the entire region other than the first region in the first display screen and the second display screen.

Further, the first display screen and the second display screen may respectively include at least one second region, but is not limited thereto.

It should be noted that, in this embodiment of the present disclosure, in a case that another object other than the camera module blocks the display screen, the electronic device may also adjust the display region of the image information in the same manner, so that the image information is not blocked by the object, thereby ensuring the display effect of the image information.

In addition, the various optional implementations described in the embodiments of the present disclosure may be implemented combined with each other or independently if they do not conflict with each other. This is not limited in the embodiments of the present disclosure.

For ease of understanding, exemplary descriptions are as follows:

It should be understood that, a touch screen and a screen described below may be replaced with a display screen.

This example is mainly for a scenario in which a user removes a detachable camera module and adheres the camera module to the display screen as a front-facing camera to take selfies. In this scenario, a larger camera module may block a viewfinder region of a display region on the screen, so that the composition and operation of the user are affected. Therefore, this example aims to resolve the influence of the blocking on the user. Alternatively, the above problem is resolved by the following means: combined with the touch screen, when the user adheres the camera module to the screen, coordinate positioning is performed; and the viewfinder region (namely, an image preview interface) dynamically changes based on the positioned coordinate, so that the camera module does not block the viewfinder region, and a viewfinder range of 100% can be provided for the user.

In this example, the camera module may refer to FIG. 2a to FIG. 2c. For a design of triggering the touch screen to report points on the detachable camera module, four metal contact points can trigger a capacitive touch screen to detect four coordinate points when coming into contact with the user's hand. The four bottom metal contact points are connected to the metal conductive ring in the top view through metal conducting wires. When the detachable camera module is handheld, the hand may come into contact with the metal conductive ring, so that the four bottom metal contact points can trigger the touch screen to report the four coordinate points at a moment when the hand comes into contact with the screen.

The four metal contact points are designed in a rectangular orientation with an edge length of N, which is for software recognition, and avoids a normal operation of the user in the viewfinder region being falsely recognized as an operation of triggering dynamic switching of the viewfinder region.

The dynamic adjustment of the viewfinder region can be triggered only when the touch screen detects four coordinate points in a rectangular orientation with equal distances.

FIG. 3a to FIG. 3d respectively show several typical placement methods in a case that the detachable camera module is attached to the screen to be used as the front-facing camera. However, actually, the camera module may not be placed horizontally, and may be casually placed by the user at an angle. The electronic device may dynamically adjust a position and a range of the viewfinder region according to different placement positions, which are Alternatively as follows:

At a moment when the user comes into contact with the screen, the touch screen may detect coordinates of the four metal contact points at the bottom of the detachable camera module.

A camera application determines, according to the detected coordinates, whether there are four points and the four points are in a rectangular orientation with an edge length of N; calculates, if the condition is true, a position of the rectangle on the screen; and then dynamically adjusts the viewfinder region according to the position, thereby ensuring that the viewfinder region is not blocked by the camera module, and the viewfinder region has a largest range in all possible situations.

Figure 4:
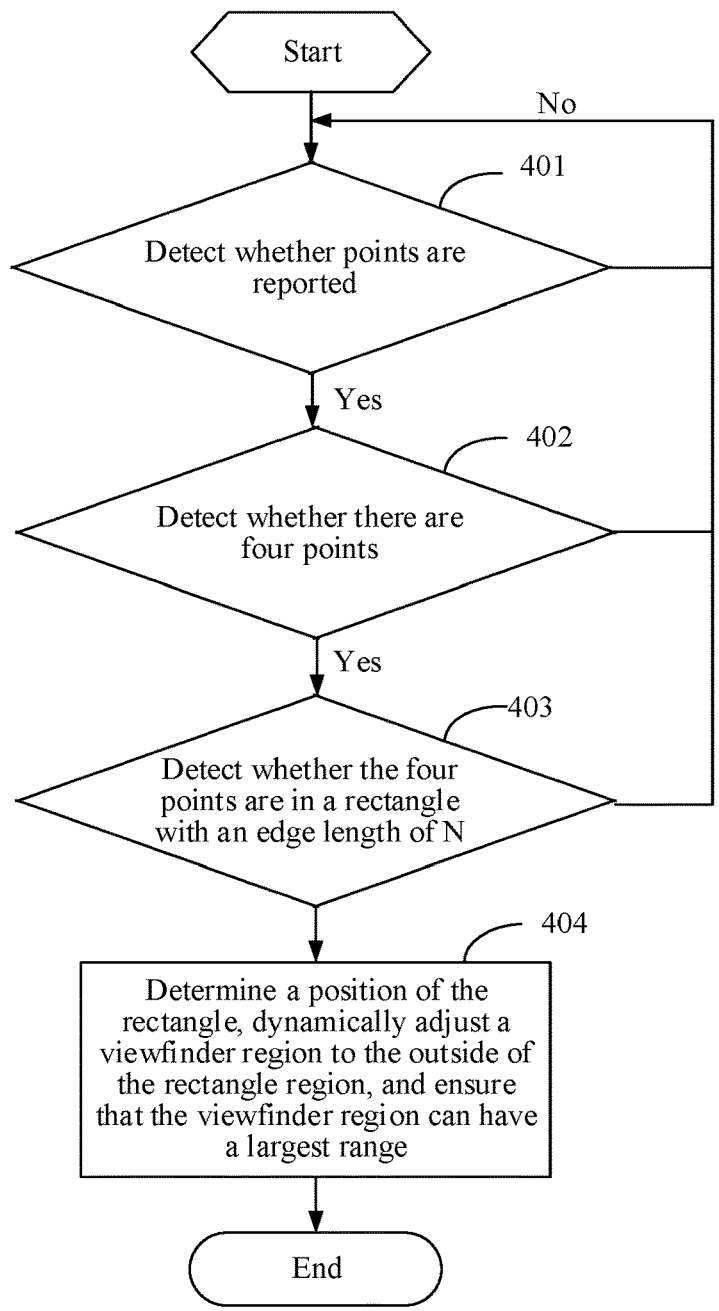
FIG. 4 is a second flowchart of a display method according to an embodiment of the present disclosure.

As shown in FIG. 4, a flowchart that the application determines is as follows:

Step 401. Detect whether points are reported.
If yes, perform step 402; otherwise, return to step 401.
Step 402. Detect whether there are four points.
If yes, perform step 403; otherwise, return to step 401.
Step 403. Detect whether the four points are in a rectangle with an edge length of N.
If yes, perform step 404; otherwise, return to step 401.
Step 404. Determine a position of the rectangle, dynamically adjust a viewfinder region to the outside of the rectangle region, and ensure that the viewfinder region can have a largest range.

In this example, in a case that a detachable camera module is attached to a screen to be used as a front-facing selfie camera, a position of the camera module on the screen can be automatically detected, and the used positioning manner is simple and reliable and has a very low cost; and the electronic device can dynamically adjust a position and a range of a viewfinder region according to the detected position of the camera module, so that the viewfinder region is not blocked by the camera module, thereby improving the user experience of taking selfies.

Figure 5:
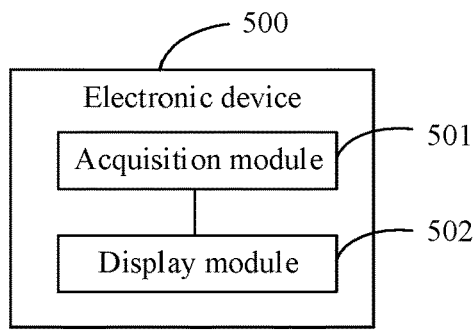
FIG. 5 is a first structural diagram of an electronic device according to an embodiment of the present disclosure.

FIG. 5 is a first structural diagram of an electronic device according to an embodiment of the present disclosure. An electronic device 500 includes a body and a camera module detachably connected to the body, and the body has a display screen. As shown in FIG. 5, the electronic device 500 includes:

an acquisition module 501, configured to acquire, by using the camera module, image information in a case that the camera module is attached to a first region of the display screen; and a first display module 502, configured to display the image information in a second region of the display screen, where the second region is a region other than the first region in the display screen.

Optionally, the camera module has a connection contact point, and the camera module is attached to the first region through the connection contact point; the body has a detection module; and the electronic device 500 further includes:
a first determining module, configured to detect the connection contact point by using the detection module, to determine the first region; and
a second determining module, configured to determine the second region according to the first region.

Optionally, N connection contact points are arranged on a first end surface on which the camera module is attached to the display screen, N being a positive integer; and the first determining module includes:
a detection unit, configured to detect a first coordinate point in the display screen by using the detection module, the first coordinate point being a coordinate point corresponding to a position at which the connection contact point is attached to the display screen; and
a first determining unit, configured to determine the first region corresponding to the first end surface according to the N first coordinate points in a case that a quantity of detected first coordinate points is equal to N and a first graph formed by the N first coordinate points matches a second graph formed by the N connection contact points.

Optionally, the detection unit is configured to: determine the first region corresponding to the first end surface according to the N first coordinate points and set positions of the N connection contact points on the first end surface, where an area of the first region is greater than or equal to that of the first end surface.

Optionally, the connection contact point is a metal contact point, and the detection module is a capacitance detection module; and in a case that the camera module is attached to the first region through the connection contact point, the body detects capacitance values of a plurality of regions of the display screen by using the capacitance detection module, and determines the first coordinate point according to the capacitance values.

Optionally, the second determining module includes:
an obtaining unit, configured to obtain a target distance between at least one target point of the first region and a target edge of the display screen; and
a second determining unit, configured to determine the second region according to the target distance, where the target point is a point on an edge of the first region; the target distance includes at least one of the following: a first target distance between a first target point and a first edge of the display screen, the first target point being a point closet to the first edge in the first region; or a second target distance between a second target point and a second edge of the display screen, the second target point being a point closet to the second edge in the first region; and the second edge is adjacent to the first edge.

Optionally, in a case that the target distance includes the first target distance or the second target distance, the second determining unit is configured to perform at least one of the following:

determining that the second region is located between the first region and the target edge in a case that the target distance is greater than a first threshold; or determining that the second region is located between the first region and a third edge in a case that the target distance is less than or equal to the first threshold, where the third edge is a fourth edge opposite to the target edge in the display screen; or in a case that the display screen includes a third region displaying a function control and edges of the third region include the fourth edge, the third edge is an edge opposite to the fourth edge in the third region.

Optionally, a quantity of second regions is P, P being a positive integer; and in a case that P is greater than 1:

the P second regions display one piece of the image information, and each of the second regions displays partial information of the image information; or at least one second region in the P second regions displays the image information.

Optionally, the electronic device is a foldable electronic device, the display screen includes a first display screen and a second display screen, and the display screen has a folded state and an unfolded state; and in a case that the display screen is in the unfolded state and the first region is partly or entirely located in the first display screen, the second region is located in at least one of the first display screen or the second display screen.

Optionally, in a case that the display screen includes a third region displaying a function control and the first region includes a part of the third region or the entire third region, the electronic device 500 further includes:

a second display module, configured to display the function control in a fourth region of the display screen, where the fourth region is a region other than the first region and the second region in the display screen.

The electronic device 500 can implement all processes that can be implemented by the electronic device in the method embodiments of the present disclosure, and achieve the same beneficial effects. To avoid repetition, details are not described herein again.

Figure 6:
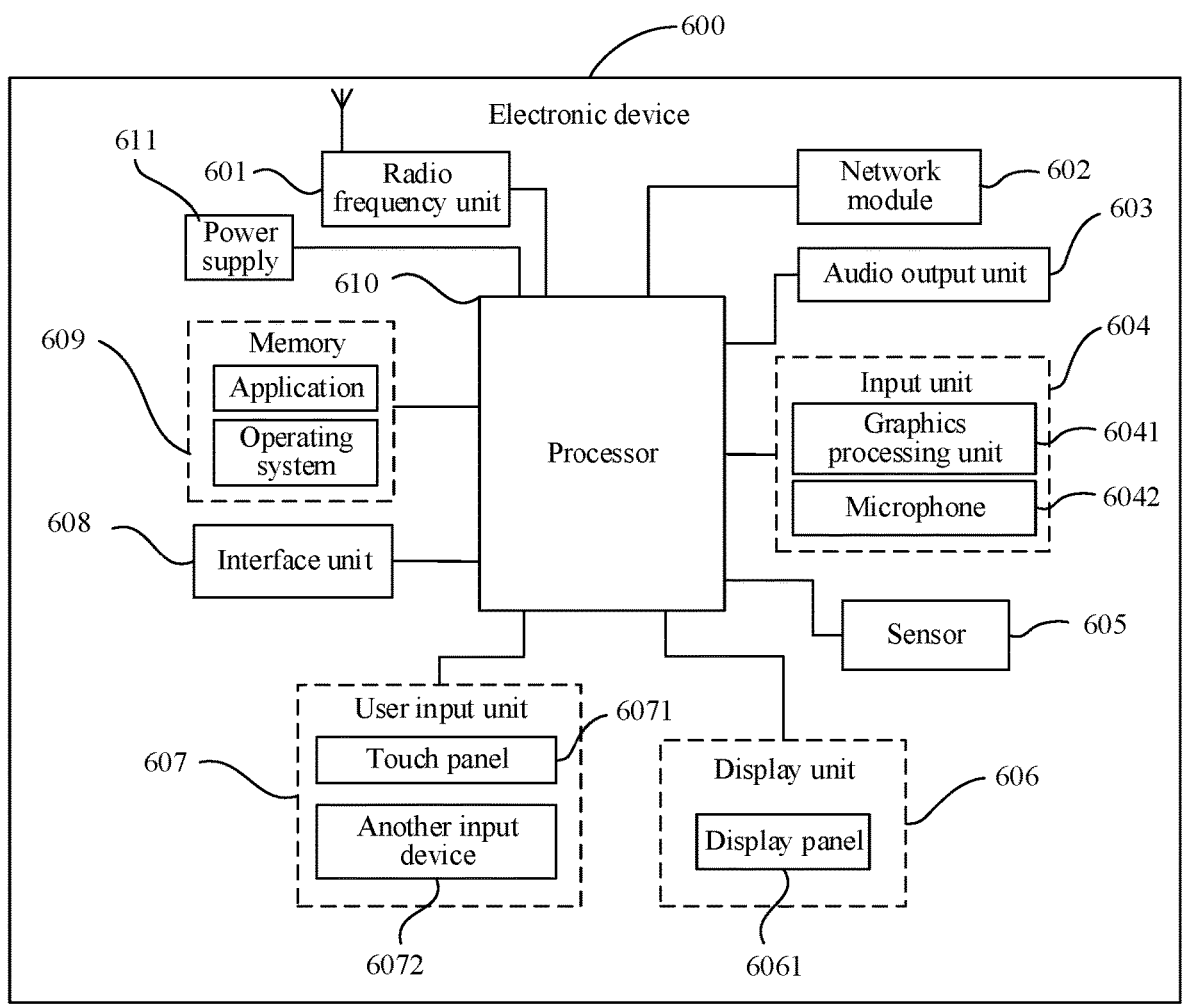
FIG. 6 is a second structural diagram of an electronic device according to an embodiment of the present disclosure.

FIG. 6 is a second structural diagram of an electronic device according to various embodiments of the present disclosure, namely, a schematic diagram of a hardware structure of an electronic device that implements the embodiments of the present disclosure. An electronic device 600 includes a body and a camera module detachably connected to the body, and the body has a display screen. As shown in FIG. 6, the electronic device 600 includes, but is not limited to, components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the electronic device shown in FIG. 6 constitutes no limitation on the electronic device, and the electronic device may include more or fewer components than those shown in the figure, or some components may be combined, or a different component deployment may be used. In this embodiment of the present disclosure, the electronic device includes, but is not limited to, a mobile phone, a tablet computer, a notebook computer, a palmtop computer, an in-vehicle electronic device, a wearable device, a pedometer, or the like.

The processor 610 is configured to:

acquire, by using the camera module, image information in a case that the camera module is attached to a first region of the display screen; and display, by using the display unit 606, the image information in a second region of the display screen, where the second region is a region other than the first region in the display screen.

Optionally, the camera module has a connection contact point, and the camera module is attached to the first region through the connection contact point; the body has a detection module; and the processor 610 is further configured to:

detect the connection contact point by using the detection module, to determine the first region; and determine the second region according to the first region.

Optionally, N connection contact points are arranged on a first end surface on which the camera module is attached to the display screen, N being a positive integer; and the processor 610 is further configured to:

detect a first coordinate point in the display screen by using the detection module, the first coordinate point being a coordinate point corresponding to a position at which the connection contact point is attached to the display screen; and determine the first region corresponding to the first end surface according to the N first coordinate points in a case that a quantity of detected first coordinate points is equal to N and a first graph formed by the N first coordinate points matches a second graph formed by the N connection contact points.

Optionally, the processor 610 is further configured to:

determine the first region corresponding to the first end surface according to the N first coordinate points and set positions of the N connection contact points on the first end surface, where an area of the first region is greater than or equal to that of the first end surface.

Optionally, the connection contact point is a metal contact point, and the detection module is a capacitance detection module; and in a case that the camera module is attached to the first region through the connection contact point, the body detects capacitance values of a plurality of regions of the display screen by using the capacitance detection module, and determines the first coordinate point according to the capacitance values.

Optionally, the processor 610 is further configured to:

obtain a target distance between at least one target point of the first region and a target edge of the display screen; and determine the second region according to the target distance, where the target point is a point on an edge of the first region; the target distance includes at least one of the following: a first target distance between a first target point and a first edge of the display screen, the first target point being a point closet to the first edge in the first region; or a second target distance between a second target point and a second edge of the display screen, the second target point being a point closet to the second edge in the first region; and the second edge is adjacent to the first edge.

Optionally, in a case that the target distance includes the first target distance or the second target distance, the processor 610 is further configured to perform at least one of the following:
  determining that the second region is located between the first region and the target edge in a case that the target distance is greater than a first threshold; or
  determining that the second region is located between the first region and a third edge in a case that the target distance is less than or equal to the first threshold, where
  the third edge is a fourth edge opposite to the target edge in the display screen; or in a case that the display screen includes a third region displaying a function control and edges of the third region include the fourth edge, the third edge is an edge opposite to the fourth edge in the third region.

Optionally, a quantity of second regions is P, P being a positive integer; and in a case that P is greater than 1:
  the P second regions display one piece of the image information, and each of the second regions displays partial information of the image information; or
  at least one second region in the P second regions displays the image information.

Optionally, the electronic device is a foldable electronic device, the display screen includes a first display screen and a second display screen, and the display screen has a folded state and an unfolded state; and
  in a case that the display screen is in the unfolded state and the first region is partly or entirely located in the first display screen, the second region is located in at least one of the first display screen or the second display screen.

Optionally, in a case that the display screen includes a third region displaying a function control and the first region includes a part of the third region or the entire third region, the processor 610 is further configured to:
  display, by using the display unit 606, the function control in a fourth region of the display screen, where
  the fourth region is a region other than the first region and the second region in the display screen.

It should be noted that, the above electronic device 600 in this embodiment can implement all processes in the method embodiments in the embodiments of the present disclosure, and achieve the same beneficial effects. To avoid repetition, details are not described herein again.

It should be understood that, in this embodiment of the present disclosure, the radio frequency unit 601 may be configured to transmit and receive information or transmit and receive signals during a call. Alternatively, the radio frequency unit is configured to receive downlink data from a base station and transmit downlink data to the processor 610 for processing. In addition, the radio frequency unit transmits uplink data to the base station. Generally, the radio frequency unit 601 includes, but is not limited to, an antenna, at least one amplifier, a transceiver, a coupler, a low noise amplifier, a duplexer, and the like. In addition, the radio frequency unit 601 may further communicate with another device through a wireless communication system and a network.

The electronic device provides wireless broadband Internet access for a user by using the network module 602, for example, allowing the user to send and receive emails, browse webpages, access streaming media content, and the like.

The audio output unit 603 may convert audio data received by the radio frequency unit 601 or the network module 602 or stored on the memory 609 into audio signals and output the audio signals as sounds. In addition, the audio output unit 603 may further provide audio output (for example, a call signal reception sound or a message reception sound) related to a specific function performed by the electronic device 600. The audio output unit 603 includes a speaker, a buzzer, a receiver, and the like The input unit 604 is configured to receive an audio or video signal. The input unit 604 may include a graphics processing unit (Graphics Processing Unit, GPU) 6041 and a microphone 6042. The graphics processing unit 6041 performs processing on image data of a static picture or a video that is obtained by an image acquisition apparatus (for example, a camera) in a video acquisition mode or an image acquisition mode. The processed image frame may be displayed on the display unit 606. An image frame that has been processed by the graphics processing unit 6041 may be stored in the memory 609 (or another storage medium) or sent by using the radio frequency unit 601 or the network module 602. The microphone 6042 may receive a sound and can process such a sound into audio data. The processed audio data may be converted, in a phone call mode, into a format that may be sent by the radio frequency unit 601 to a mobile communication base station.

The electronic device 600 further includes at least one sensor 605 such as an optical sensor, a motion sensor, or another sensor. Alternatively, the optical sensor includes an ambient light sensor and a proximity sensor. The ambient light sensor may adjust luminance of a display panel 6061 according to brightness of the ambient light. The proximity sensor may switch off the display panel 6061 and/or backlight when the electronic device 600 is moved to the ear. As a type of motion sensor, an acceleration sensor can detect magnitudes of accelerations in various directions (generally, on three axes), may detect a magnitude and a direction of the gravity in a static state, and may be applied to recognizing an altitude of the electronic device (for example, switching between a landscape state and a portrait state, a related game, and magnetometer attitude calibration), a function related to vibration recognition (such as a pedometer and a knock), and the like. The sensor 605 may further include a fingerprint sensor, a pressure sensor, an iris sensor, a molecular sensor, a gyroscope, a barometer, a hygrometer, a thermometer, an infrared sensor, and the like, which are not described herein in detail.

The display unit 606 is configured to display information inputted by the user or information provided for the user. The display unit 606 may include a display panel 6061. The display panel 6061 may be configured in the form of a liquid crystal display (LCD), an organic light-emitting diode (OLED), or the like.

The user input unit 607 may be configured to receive input digit or character information, and generate a keyboard signal input related to the user setting and function control of the electronic device. Alternatively, the user input unit 607 includes a touch panel 6071 and another input device 6072. The touch panel 6071, also referred to as a display screen, may collect a touch operation of a user on or near the touch panel (such as an operation of a user on or near the touch panel 6071 by using any suitable object or attachment, such as a finger or a touch pen). The touch panel 6071 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 610. Moreover, the touch controller may receive and execute a command transmitted from the processor 610. In addition, the touch panel 6071 may be implemented by using various types, such as a resistive type, a capacitance type, an infrared type, and a surface acoustic wave type. In addition to the touch panel 6071, the user input unit 607 may further include the another input device 6072. Alternatively, the another input device 6072 may include, but is not limited to, a physical keyboard, a functional key (for example, a volume control key or a switch key), a track ball, a mouse, and a joystick, and the details will not be described herein again.

Further, the touch panel 6071 may cover the display panel 6061. After detecting a touch operation on or near the touch panel, the touch panel 6071 transfers the touch operation to the processor 610, to determine a type of a touch event. Then, the processor 610 provides a corresponding visual output on the display panel 6061 according to the type of the touch event. In FIG. 6, the touch panel 6071 and the display panel 6061 implement, as two independent parts, input and output functions of the electronic device. However, in some embodiments, the touch panel 6071 and the display panel 6061 may be integrated to implement the input and output functions of the electronic device. The details are not limited herein.

The interface unit 608 is an interface for connecting an external apparatus and the electronic device 600. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 608 may be configured to receive an input (for example, data information or electricity) from an external apparatus and transmit the received input to one or more elements in the electronic device 600, or may be configured to transmit data between the electronic device 600 and the external apparatus.

The memory 609 may be configured to store a software program and various data. The memory 609 may mainly include a program storage region and a data storage region. The program storage region may store an operating system, an application program required by at least one function (for example, a sound playback function and an image playback function), or the like. The data storage region may store data (for example, audio data and a phone book) created according to use of the mobile phone. In addition, the memory 609 may include a high speed random access memory, and may also include a non-volatile memory, such as at least one magnetic disk storage device, a flash memory, or another volatile solid-state storage device.

The processor 610 is a control center of the electronic device, and connects to various parts of the electronic device by using various interfaces and lines. By running or executing the software program and/or module stored in the memory 609, and invoking data stored in the memory 609, the processor performs various functions and data processing of the electronic device, thereby performing overall monitoring on the electronic device. Optionally, the processor 610 may include one or more processing units. Preferably, the processor 610 may integrate an application processor and a modem. The application processor mainly processes an operating system, a user interface, an application program, and the like. The modem mainly processes wireless communication. It may be understood that the foregoing modem may not be integrated into the processor 610.

The electronic device 600 may further include the power supply 611 (for example, a battery) for supplying power to the components. Preferably, the power supply 611 may be logically connected to the processor 610 by a power management system, thereby implementing functions such as charging, discharging, and power consumption management by using the power management system.

In addition, the electronic device 600 includes some functional module that are not shown, which are not described herein in detail.

Preferably, an embodiment of the present disclosure further provides an electronic device, including a processor 610, a memory 609, and a program stored on the memory 609 and executable on the processor 610, the program, when executed by the processor 610, implementing all processes of the embodiments of the display method described above, and can achieve the same technical effects. To avoid repetition, details are not described herein again.

An embodiment of the present disclosure further provides a computer-readable storage medium, storing a computer program, the computer program, when executed by a processor, implementing all processes of the embodiments of the display method described above, and can achieve the same technical effects. To avoid repetition, details are not described herein again. The computer-readable storage medium may include a flash drive, a read-only memory (Read-Only Memory, ROM), a random access memory (Random Access Memory, RAM), a magnetic disk, or an optical disc.

It should be noted that, the term "include", "comprise" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one . . . " does not exclude that there are still other same elements in the processes, methods, objects, or apparatuses.

It should be noted that, it should be understood that, division of the modules of the above device is merely division of logic functions, and during actual implementation, the modules may be entirely or partly integrated into a physical entity, or can be physically separated. These modules may be entirely implemented in a form of invoking software through processing elements; or may be entirely implemented in a form of hardware; or one part of the modules may be implemented in a form of invoking software through processing elements, and the other part of the modules may be implemented in a form of hardware. For example, the acquisition module may be an independently established processing element, or may be integrated into a chip of the above apparatus to realize. In addition, the acquisition module may also be stored on the memory of the above apparatus in a form of program code, and is invoked by a processing element of the above apparatus to execute the functions of the acquisition module. The implementation of other modules is similar to this. In addition, all or part of these modules may be integrated together, and may also be implemented independently. The processing element herein may be an integrated circuit chip, having a signal processing capability. In an implementation process, steps in the above methods or the above modules can be implemented by using a hardware integrated logical circuit in the processing element, or by using instructions in a form of software.

For example, the modules, units, sub-units, or sub-modules may be configured as one or more integrated circuits for implementing the above method, for example, one or more application-specific integrated circuits (Application Specific Integrated Circuits, ASIC), or one or more microprocessors (digital signal processor, DSP), or one or more field-programmable gate arrays (Field Programmable Gate Array, FPGA). In another example, when one of the above modules is implemented in a form of scheduling program code through a processing element, the processing element may be a general-purpose processor, such as a central processing unit (Central Processing Unit, CPU) or another processor that can invoke the program code. In another example, these modules may be integrated together, and are implemented in a form of a system-on-a-chip (system-on-a-chip, SOC).

In the specification and the claims of this application, "and/or" means at least one of the connected objects. For example, "A and/or B" may represent three cases: only A exists, only B exists, and both A and B exist. "At least one of A and B" also represents three cases: only A exists, only B exists, and both A and B exist.

Through the descriptions of the foregoing implementations, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions of the present disclosure essentially, or the part contributing to the prior art, may be presented in the form of a software product. The computer software product is stored in a storage medium (for example, a ROM/RAM, a magnetic disk, or an optical disc) including several instructions to enable an electronic device (which may be a mobile phone, a computer, a server, an air conditioner, a network device, or the like) to perform the methods described in the embodiments of the present disclosure.

The embodiments of the present disclosure are described above with reference to the accompanying drawings. However, the present disclosure is not limited to the foregoing specific implementations. The foregoing specific implementations are illustrative instead of limitative. Enlightened by the present disclosure, a person of ordinary skill in the art can make many forms without departing from the idea of the present disclosure and the scope of protection of the claims. All of the forms fall within the protection of the present disclosure.

What is claimed is:

1. A display method performed by an electronic device, wherein the electronic device comprises a body and a camera module detachably connected to the body, the body has a display screen, and the method comprises:
   acquiring, by using the camera module, image information in a case that the camera module is attached to a first region of the display screen; and
   displaying the image information in a second region of the display screen, wherein
   the second region is a region other than the first region in the display screen;
   wherein the camera module has a connection contact point, and the camera module is attached to the first region through the connection contact point; the body has a detection module; and
   before the displaying the image information in a second region of the display screen, the method further comprises:
   detecting the connection contact point by using the detection module, to determine the first region; and
   determining the second region according to the first region;
   wherein the determining the second region according to the first region comprises:
   obtaining a target distance between at least one target point of the first region and a target edge of the display screen; and
   determining the second region according to the target distance, wherein
   the target point is a point on an edge of the first region; the target distance comprises at least one of the following: a first target distance between a first target point and a first edge of the display screen, the first target point being a point closet to the first edge in the first region; or a second target distance between a second target point and a second edge of the display screen, the second target point being a point closet to the second edge in the first region; and the second edge is adjacent to the first edge.

2. The method according to claim 1, wherein N connection contact points are arranged on a first end surface on which the camera module is attached to the display screen, N being a positive integer; and
   the detecting the connection contact point by using the detection module, to determine the first region comprises:
   detecting a first coordinate point in the display screen by using the detection module, the first coordinate point being a coordinate point corresponding to a position at which the connection contact point is attached to the display screen; and
   determining the first region corresponding to the first end surface according to the N first coordinate points in a case that a quantity of detected first coordinate points is equal to N and a first graph formed by the N first coordinate points matches a second graph formed by the N connection contact points.

3. The method according to claim 2, wherein the determining the first region corresponding to the first end surface according to the N first coordinate points comprises:
   determining the first region corresponding to the first end surface according to the N first coordinate points and set positions of the N connection contact points on the first end surface, wherein
   an area of the first region is greater than or equal to that of the first end surface.

4. The method according to claim 2, wherein the connection contact point is a metal contact point, and the detection module is a capacitance detection module; and
   in a case that the camera module is attached to the first region through the connection contact point, the body detects capacitance values of a plurality of regions of the display screen by using the capacitance detection module, and determines the first coordinate point according to the capacitance values.

5. The method according to claim 1, wherein in a case that the target distance comprises the first target distance or the second target distance, the determining the second region according to the target distance comprises at least one of the following:

determining that the second region is located between the first region and the target edge in a case that the target distance is greater than a first threshold; or determining that the second region is located between the first region and a third edge in a case that the target distance is less than or equal to the first threshold, wherein the third edge is a fourth edge opposite to the target edge in the display screen; or in a case that the display screen comprises a third region displaying a function control and edges of the third region comprise the fourth edge, the third edge is an edge opposite to the fourth edge in the third region.

6. The method according to claim 1, wherein a quantity of second regions is P, P being a positive integer; and in a case that P is greater than 1:

the P second regions display one piece of the image information, and each of the second regions displays partial information of the image information; or at least one second region in the P second regions displays the image information.

7. The method according to claim 1, wherein the electronic device is a foldable electronic device, the display screen comprises a first display screen and a second display screen, and the display screen has a folded state and an unfolded state; and in a case that the display screen is in the unfolded state and the first region is partly or entirely located in the first display screen, the second region is located in at least one of the first display screen or the second display screen.

8. The method according to claim 1, wherein in a case that the display screen comprises a third region displaying a function control and the first region comprises a part of the third region or the entire third region, the method further comprises:

displaying the function control in a fourth region of the display screen, wherein the fourth region is a region other than the first region and the second region in the display screen.

9. An electronic device, wherein the electronic device comprises a body and a camera module detachably connected to the body, the body has a display screen, the electronic device comprising:

a processor; and a memory storing a program that is executable on the processor, wherein the program, when executed by the processor, causes the electronic device to perform the following steps:

acquiring, by using the camera module, image information in a case that the camera module is attached to a first region of the display screen; and displaying the image information in a second region of the display screen, wherein the second region is a region other than the first region in the display screen;

the camera module has a connection contact point, and the camera module is attached to the first region through the connection contact point; the body has a detection module; and before the displaying the image information in a second region of the display screen, the program, when executed by the processor, further causes the electronic device to perform the following steps:

detecting the connection contact point by using the detection module, to determine the first region; and determining the second region according to the first region;

wherein the determining the second region according to the first region comprises:

obtaining a target distance between at least one target point of the first region and a target edge of the display screen; and determining the second region according to the target distance, wherein the target point is a point on an edge of the first region; the target distance comprises at least one of the following: a first target distance between a first target point and a first edge of the display screen, the first target point being a point closet to the first edge in the first region; or a second target distance between a second target point and a second edge of the display screen, the second target point being a point closet to the second edge in the first region; and the second edge is adjacent to the first edge.

10. The electronic device according to claim 9, wherein N connection contact points are arranged on a first end surface on which the camera module is attached to the display screen, N being a positive integer; and the detecting the connection contact point by using the detection module, to determine the first region comprises:

detecting a first coordinate point in the display screen by using the detection module, the first coordinate point being a coordinate point corresponding to a position at which the connection contact point is attached to the display screen; and determining the first region corresponding to the first end surface according to the N first coordinate points in a case that a quantity of detected first coordinate points is equal to N and a first graph formed by the N first coordinate points matches a second graph formed by the N connection contact points.

11. The electronic device according to claim 10, wherein the determining the first region corresponding to the first end surface according to the N first coordinate points comprises:

determining the first region corresponding to the first end surface according to the N first coordinate points and set positions of the N connection contact points on the first end surface, wherein an area of the first region is greater than or equal to that of the first end surface.

12. The electronic device according to claim 10, wherein the connection contact point is a metal contact point, and the detection module is a capacitance detection module; and in a case that the camera module is attached to the first region through the connection contact point, the body detects capacitance values of a plurality of regions of the display screen by using the capacitance detection module, and determines the first coordinate point according to the capacitance values.

13. The electronic device according to claim 9, wherein in a case that the target distance comprises the first target distance or the second target distance, the determining the second region according to the target distance comprises at least one of the following:

determining that the second region is located between the first region and the target edge in a case that the target distance is greater than a first threshold; or determining that the second region is located between the first region and a third edge in a case that the target distance is less than or equal to the first threshold, wherein the third edge is a fourth edge opposite to the target edge in the display screen; or in a case that the display screen comprises a third region displaying a function control and edges of the third region comprise the fourth edge, the third edge is an edge opposite to the fourth edge in the third region.

14. The electronic device according to claim 9, wherein a quantity of second regions is P, P being a positive integer; and in a case that P is greater than 1:

the P second regions display one piece of the image information, and each of the second regions displays partial information of the image information; or at least one second region in the P second regions displays the image information.

15. The electronic device according to claim 9, wherein the electronic device is a foldable electronic device, the display screen comprises a first display screen and a second display screen, and the display screen has a folded state and an unfolded state; and in a case that the display screen is in the unfolded state and the first region is partly or entirely located in the first display screen, the second region is located in at least one of the first display screen or the second display screen.

16. The electronic device according to claim 9, wherein in a case that the display screen comprises a third region displaying a function control and the first region comprises a part of the third region or the entire third region, the program, when executed by the processor, further causes the electronic device to perform the following steps:

displaying the function control in a fourth region of the display screen, wherein the fourth region is a region other than the first region and the second region in the display screen.

* * * * *